US012761439B2

(12) United States Patent
Jun et al.

(10) Patent No.: US 12,761,439 B2
(45) Date of Patent: Oct. 13, 2026

(54) OPTICAL FIBER RIBBONIZING ADHESIVE APPLICATOR

(71) Applicant: UCLSWIFT Co., Ltd., Daejeon (KR)

(72) Inventors: Kun Ik Jun, Gyeongsangnam-do (KR); Sang Cheol Jun, Chungcheongbuk-do (KR)

(73) Assignee: UCLSWIFT CO., LTD., Daejeon (KR)

( * ) Notice: Subject to any disclaimer, the term of this patent is extended or adjusted under 35 U.S.C. 154(b) by 155 days.

(21) Appl. No.: 18/740,323

(22) Filed: Jun. 11, 2024

(65) Prior Publication Data

US 2025/0377517 A1 Dec. 11, 2025

(51) Int. Cl.
*G02B 6/44* (2006.01)
*G02B 6/255* (2006.01)

(52) U.S. Cl.
CPC .................................... *G02B 6/448* (2013.01)

(58) Field of Classification Search
CPC .............................. G02B 6/448; G02B 6/2555
See application file for complete search history.

(56) References Cited

U.S. PATENT DOCUMENTS 4,720,165 A * 1/1988 Tokuda .................. G02B 6/448 156/166
5,252,050 A * 10/1993 Zimmer ................ B29C 48/156 425/114
5,388,174 A * 2/1995 Roll ..................... G02B 6/3839 385/71
2013/0240124 A1 9/2013 Wakjira et al.
2022/0082758 A1* 3/2022 Nguyen ............... G02B 6/3898
2024/0142702 A1* 5/2024 Kurino ................. G02B 6/3616

FOREIGN PATENT DOCUMENTS

KR 102325582 B1 * 11/2021 ............. G02B 6/448

OTHER PUBLICATIONS

Machine Translation of KR-102325582 (Year: 2021).*

* cited by examiner

*Primary Examiner* — George R Koch
*Assistant Examiner* — Christopher C Caillouet
(74) *Attorney, Agent, or Firm* — You & IP, LLC

(57) ABSTRACT

Disclosed is an optical fiber ribbonizing adhesive applicator, and more specifically, an optical fiber ribbonizing adhesive applicator configured to ribbonize multiple optical fibers into a single one before a plurality of individual optical fibers are fused together, by enabling the multiple strands of optical fibers to which an adhesive has been applied to be ribbonized in a straight-line shape in a longitudinal direction without being bent, and further an adhesive storage tray is provided to enable an excess adhesive to be evenly applied to the optical fibers.

1 Claim, 5 Drawing Sheets

OPTICAL FIBER RIBBONIZING ADHESIVE APPLICATOR

BACKGROUND OF THE INVENTION

Field of the Invention

The present invention relates to an optical fiber ribbonizing adhesive applicator configured to apply an adhesive to multiple strands of optical fibers and vertically straighten and align the optical fibers, thereby ribbonizing the optical fibers to enable accurate alignment when fusing optical fibers.

Description of the Related Art

In the modern information-oriented society, the role of communication networks is very important. In particular, as network communications such as the Internet have developed and a large amount of data such as voice data or video data is transmitted, there is a demand for an increase in throughput and processing speed of information, and thus there is an urgent demand for the expansion of communication networks.

In order to meet these demands, optical cables are used instead of existing coaxial cables as a way to process large amounts of information at high speeds, and the use of optical cables is rapidly increasing.

In the case of an optical cable made up of several strands of single-core optical fibers, the single-core optical fibers are ribbonized, a sheath of one end of respective two ribbonized optical fibers is stripped off and cut to a length suitable for cable layout, and then fusion splicing of the optical fibers is performed by a separate fusing device.

Here, multiple strands of single-core optical fibers need to be aligned in a horizontally integrated ribbon shape using an adhesive. However, when a worker manually applies an adhesive to multiple strands of optical fibers and ribbonizes the optical fibers, the difference in degree of extension between the multiple strands of optical fibers cause the lengths to vary, or the optical fibers are bent when being drawn while the adhesive is applied thereto in a longitudinal direction.

In this case, when the two ribbonized optical fibers are later fused together by a fusing device, it is difficult to achieve accurate alignment thereof, thereby causing problems in fusion.

CITATION LIST

Patent Literature

Patent Literature 1: United States Patent Application Publication No. US2013/0240124 (Sep. 19, 2013SUMMARY OF THE INVENTION The present invention is made to solve the above-described problem, and an object of the present invention is to provide an optical fiber ribbonizing adhesive applicator configured to ribbonize one ends of multiple strands of optical fibers into a single one before two optical fibers are fused together by fusion means by applying an adhesive to the multiple strands of optical fibers and then drawing the optical fibers horizontally and straightly in a longitudinal direction thereof to enable the ribbonized optical fibers to be straightly drawn in the longitudinal direction without being bent and enable the ribbonized optical fibers to be accurately aligned at the time of later fusion, and further an adhesive storage tray is provided below an optical fiber alignment portion to enable an excess adhesive in the adhesive storage tray to be evenly applied to the optical fibers.

Other objects and advantages of the present invention will be described below, and will be understood with the embodiment of the present invention. In addition, the objects and advantages of the present invention can be realized by means and combinations represented in the claims.

According to the present invention, as means to solve the above problem, there is provided an optical fiber ribbonizing adhesive applicator including:

a clamp sheet (20) that has a grip portion (21) formed to enable the clamp sheet to be installed vertically upright at a preset installation position and an optical fiber alignment portion (26) formed by cutting a body portion (23), and that causes optical fibers (10) to be inserted horizontally into the optical fiber alignment portion (26) so that positions of the optical fibers are fixed; and an insertion step (25) that makes a width (D) on one side of the optical fiber alignment portion (26) in which the optical fibers (10) are loaded horizontally to be relatively smaller than a diameter of the optical fibers (10) to keep the multiple optical fibers (10) loaded in the optical fiber alignment portion (26) from escaping therefrom, in which an adhesive storage tray (27) is provided below the optical fiber alignment portion (26), the multiple optical fibers (10) are fixed at positions in the clamp sheet (20), an adhesive is applied to surfaces of the multiple optical fibers (10) on one side of the clamp sheet (20), the multiple optical fibers (10) are drawn horizontally in a longitudinal direction from the other side of the clamp sheet (20) so that multiple strands of the optical fibers (10) are aligned in a straight-line shape without being bent, and an excess adhesive in the adhesive storage tray (27) is evenly applied to the optical fibers when the optical fibers are ribbonized to a single optical fiber (10), the optical fiber ribbonizing adhesive applicator comprises horizontal moving means (30) for allowing the clamp sheet (20) to be vertically mounted thereon and enabling the multiple strands of optical fibers (10) inserted into the clamp sheet (20) to be drawn in a horizontally straight-line shape in the longitudinal direction, the horizontal moving means (30) includes a support (31) having, on one side of an upper surface, a fixing groove (32) in which the clamp sheet (20) is mounted vertically, and a sliding portion (34) which is installed to be slidable and straightly movable along a guide groove (33) cut in an upper surface of the support (31) in a longitudinal direction and to which one ends of multiple strands of optical fibers (10) which are inserted and fixed into the clamp sheet (20) are fixed, the sliding portion (34) includes a fixing portion (35) to which the one ends of the multiple strands of optical fibers (10) are fixed, and a settlement portion (36) which is formed integrally on one side of the fixing portion (35) and has a mounting space (37) in a longitudinal direction to allow a part including an optical connector to be settled in the longitudinal direction in a case where the optical connector is coupled to the one ends of the multiple strands of optical fibers (10) and allow the multiple strands of optical fibers (10) to be settled in the longitudinal direction in a case where the optical connector is not coupled thereto.

DETAILED DESCRIPTION OF THE PREFERRED EMBODIMENTS

Figure 1:
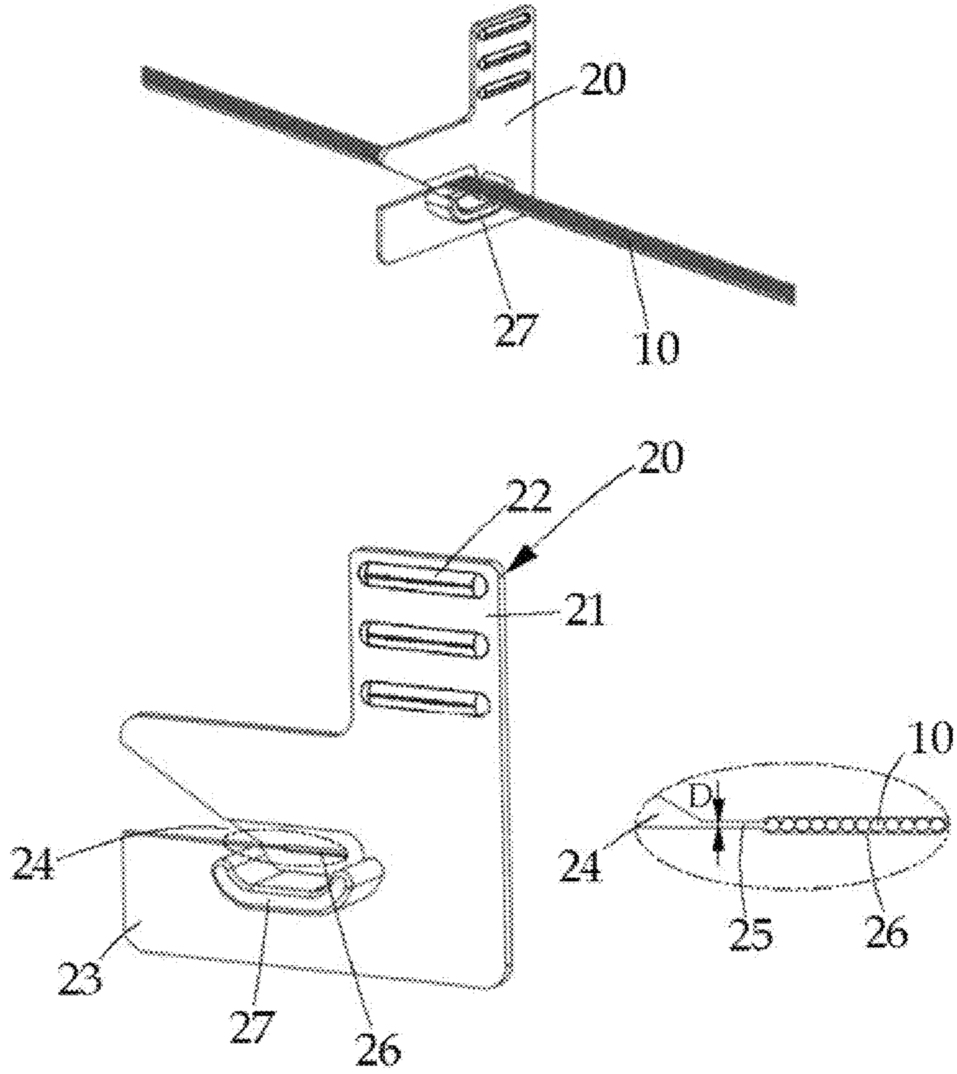
FIG. 1 is a view illustrating an embodiment of an optical fiber ribbonizing adhesive applicator according to the present invention.

Before various embodiments of the present invention are described in detail, it will be understood that application thereof is not limited to details of the configurations and arrangements of the components described in the following detailed description or illustrated in the drawings. The present invention can be realized and implemented into other embodiments and can be carried out in various manners. In addition, it will be understood that expressions and predicates used herein with respect to terms such as a device or an element orientation (for example, "front", "back", "up", "down", "top", "bottom", "left", "right", "lateral") are used only to simplify the description of the present invention and do not indicate or mean that the device or an element involved should simply have a particular orientation. In addition, terms such as "first" and "second" are used herein and in the accompanying claims for illustrative description and are not intended to indicate or mean relative significance or meaning of the terms.

The present invention has the following features to achieve the above-described object.

Hereinafter, a preferred embodiment of the present invention will be described in detail with reference to the accompanying drawings. Before the detailed description, terms or words used in this specification or claims shall not be construed as a meaning limited to a common or dictionary meaning but construed as a meaning and a concept in accordance with technical ideas of the present invention based on the principle that an inventor can define a concept of a term in order to describe his or her invention in the best way as appropriate.

Hence, since each embodiment described in this specification and each configuration illustrated in the drawings are provided only as a most preferred embodiment of the present invention and do not represent all of the technical ideas of the present invention, it should be understood that there can be various equivalents and modification examples which can substitute the embodiments and the configurations of the present invention at the time of this application.

Figure 2:
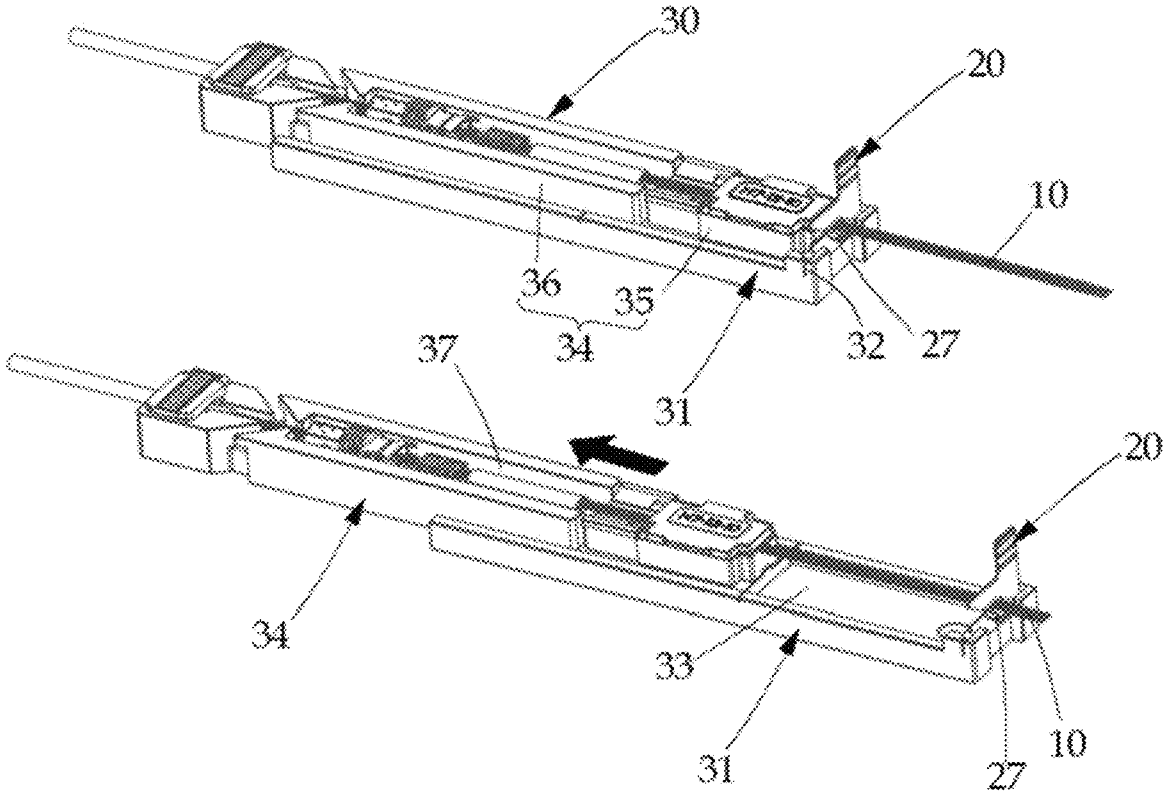
FIGS. 2 and 3 are views illustrating a state in which a clamp sheet is mounted on horizontal moving means according to the present invention and optical fibers are ribbonized.
Figure 3:
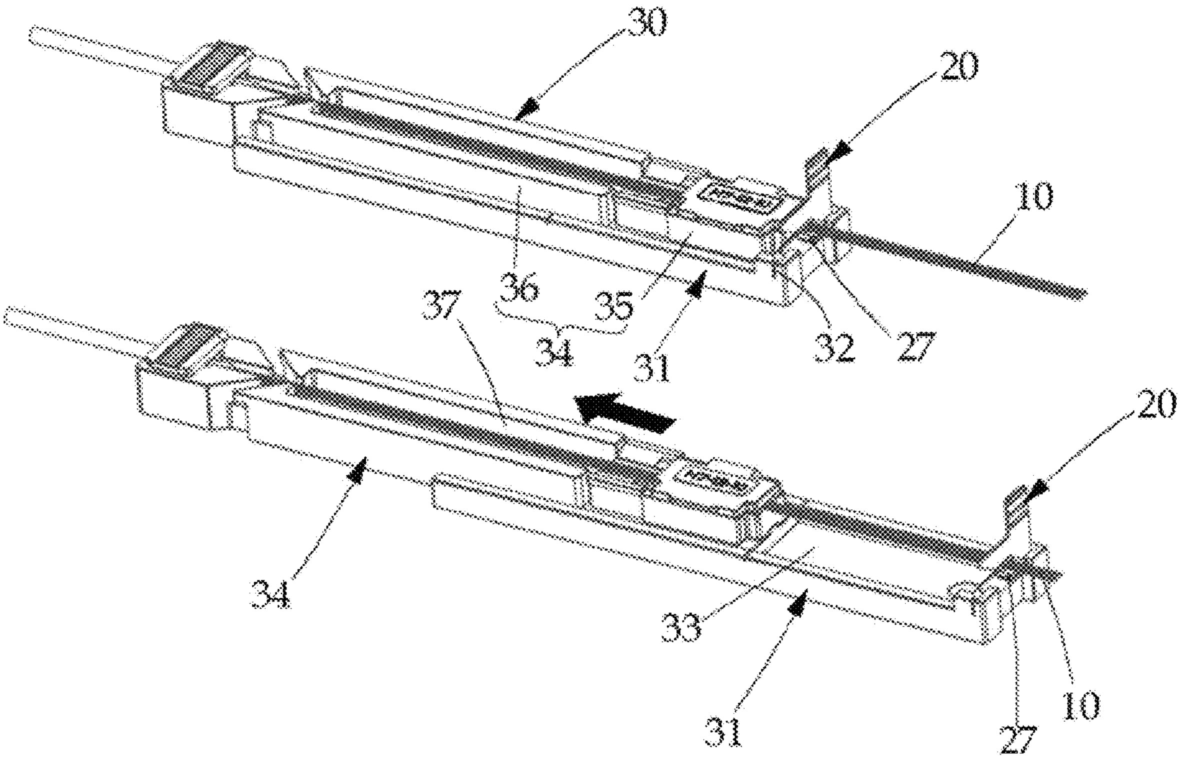
Figure 4:
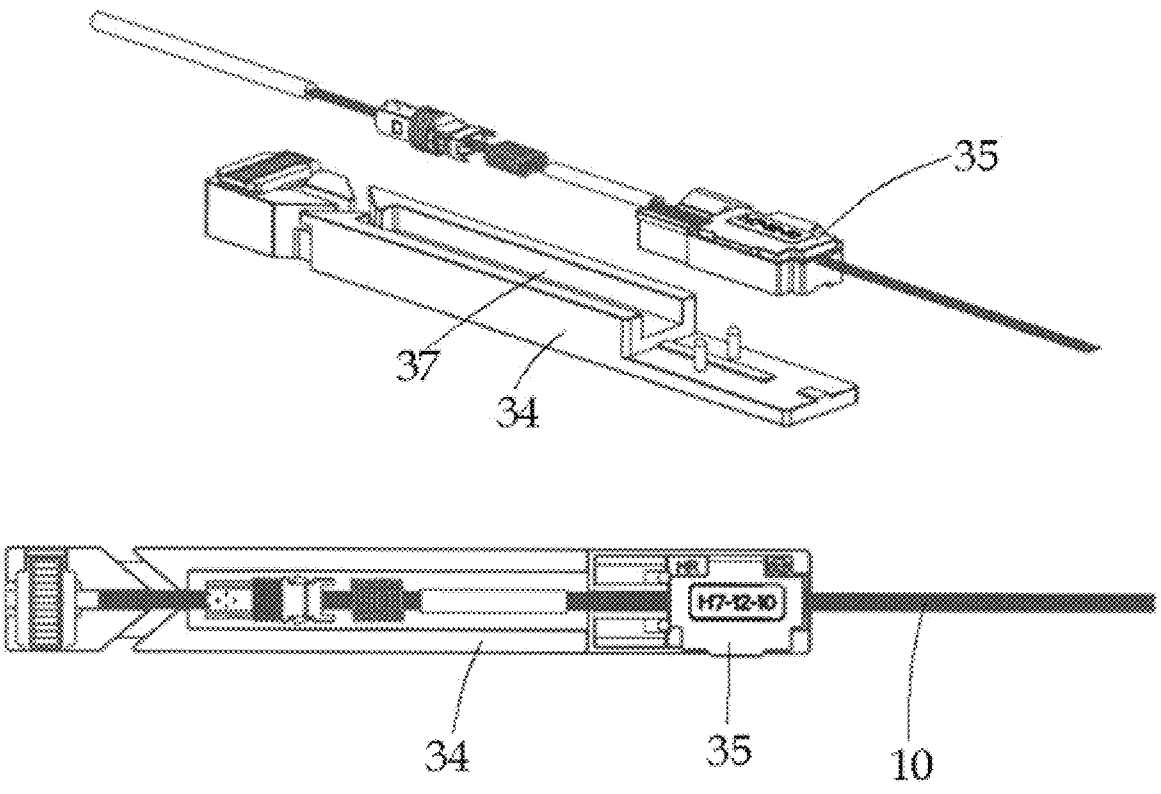
FIG. 4 is a view illustrating the horizontal moving means according to the present invention.
Figure 5:
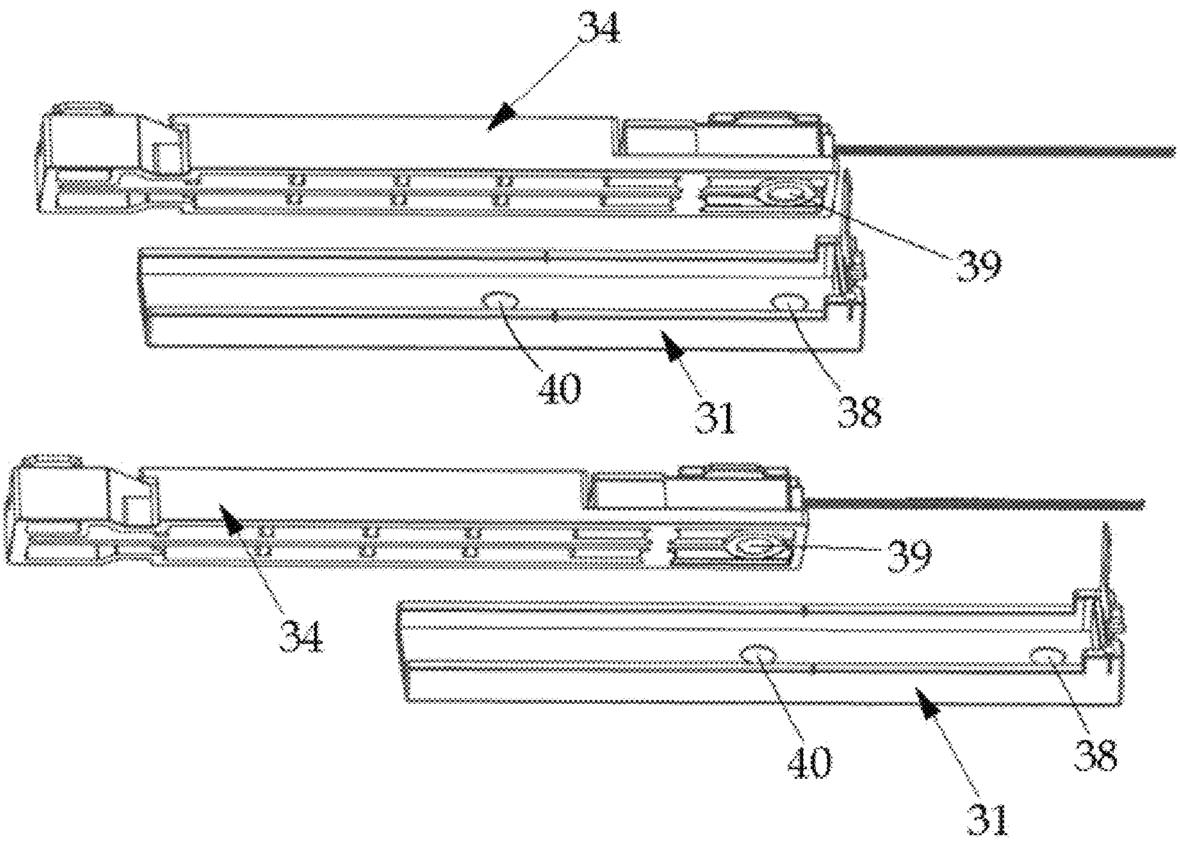
FIG. 5 is a view illustrating an embodiment with a permanent magnet according to the present invention.

Hereinafter with reference to FIGS. 1 to 5, an optical fiber ribbonizing adhesive applicator according to a preferred embodiment of the present invention will be described in detail.

According to the optical fiber ribbonizing adhesive applicator of the present invention, optical fibers 10 are fixed at positions in a clamp sheet 20, an adhesive is applied to the optical fibers 10 on one side of the clamp sheet 20, the optical fibers 10 are drawn horizontally in a longitudinal direction from the other side of the clamp sheet 20 so that multiple strands of optical fibers 10 are aligned in a straight-line shape without being bent, and the optical fibers are ribbonized into a single optical fiber 10. Hence, when the ribbonized single optical fiber 10 is later fused with another optical fiber, it is possible to perform accurate horizontal alignment thereof.

To this end, the optical fiber ribbonizing adhesive applicator includes optical fibers 10, a clamp sheet 20, an insertion step 25, an optical fiber alignment portion 26, and horizontal moving means 30.

The clamp sheet 20 is used to align optical fibers 10 including multiple strands of fibers (ex: twelve-core fiber) in a straight line of a single strand, and the clamp sheet 20 has a plate-like 'L' shape.

The clamp sheet 20 has a grip portion 21 formed at an upper portion thereof to enable a user to install the clamp sheet 20 vertically upright at a preset installation position (the grip portion 21 may have a protruding surface 22 for an anti-slip effect and easy grip), a body portion 23 provided below the grip portion 21 and having an area larger than that of the grip portion 21, and the optical fiber alignment portion 26 formed by cutting the body portion 23 in a horizontal direction intersecting the grip portion 21, and the optical fibers 10 are inserted horizontally into the optical fiber alignment portion 26 so that the positions of the optical fibers are fixed.

A loading portion 24 is formed to have an 'L'-shaped empty space with a width gradually narrowed from one side of the body portion 23 to the insertion step 25 to facilitate loading of the optical fibers 10 toward the optical fiber alignment portion 26. In other words, a lower part of the loading portion 24 is horizontally formed in a straight line, and an upper part thereof is formed in a diagonal line.

In addition, an insertion step 25 is formed on one side of the optical fiber alignment portion 26 into which the multiple strands of optical fibers 10 are loaded horizontally, in which a width D of the insertion step 25 is relatively smaller than a diameter of the optical fibers 10, thereby the optical fibers 10 inserted into the optical fiber alignment portion 26 are kept from escaping.

In other words, the multiple strands of optical fibers 10 are inserted in the order of the loading portion 24, the insertion step 25, the optical fiber alignment portion 26. Since the size of the insertion step 25 is smaller than that of the optical fibers, the entire clamp sheet 20 can be made of a bendable material so that the multiple strands of optical fibers 10 can be easily inserted through the loading portion 24 and the insertion step 25.

In addition, in the present invention, an adhesive storage tray 27 is provided below the optical fiber alignment portion 26, thereby enabling an excess adhesive in the adhesive storage tray 27 to be evenly applied to the optical fibers.

The adhesive storage tray 27 projects in a 'U' shape below the optical fiber alignment portion 26, and the adhesive applied to the optical fibers does not flow down when the horizontal moving means 30 is moved so that adhesion of lower parts of the optical fibers is easily performed.

The horizontal moving means 30 allows the clamp sheet 20 to be vertically mounted thereon and enables the multiple strands of optical fibers 10 inserted into the clamp sheet 20 to be drawn in a horizontally straight-line shape in the longitudinal direction.

The horizontal moving means 30 for this includes a support 31 and a sliding portion 34.

The support 31 is a part where a fixing groove 32 in which the clamp sheet 20 is mounted vertically is formed on one side of an upper surface.

The sliding portion 34 is installed to be slidable and straightly movable along a guide groove 33 cut in an upper surface of the support 31 in a longitudinal direction and to which one ends of the multiple strands of optical fibers 10 which are inserted and fixed into the clamp sheet 20 are fixed. The sliding portion has a structure in which the sliding portion slides and horizontally moves in the longitudinal direction on the upper surface of the support 31 in a state in which the one ends of the multiple strands of optical fibers 10 are fixed to the sliding portion 34.

This sliding portion 34 includes a fixing portion 35 and a settlement portion 36; the fixing portion 35 is a portion to which the one ends of the multiple strands of optical fibers 10 are fixed, and the settlement portion 36 is formed integrally on one side of the fixing portion 35 and is a portion that forms a mounting space 37 in the longitudinal direction.

Accordingly, in a case where an optical connector is coupled at the end of the multiple strands of optical fibers 10, a part including the optical connector is settled in the longitudinal direction in the settlement portion 36.

In a case where the optical connector is not coupled thereto, the multiple strands of optical fibers 10 are settled in the longitudinal direction in the settlement portion 36.

In addition, in the present invention, a permanent magnet 39 is provided on a lower side of the horizontal moving means 30, and a permanent magnet 38 is further provided at the support 31 having a guide groove 33, so that the horizontal moving means 30 can be brought into close contact with the clamp sheet 20 to enable ribbonizing work to be stably performed. Further, a permanent magnet 40 is additionally provided at the support 31 so that a movement distance of the horizontal moving means 30 can be constantly maintained.

As described above, the present invention ribbonizes multiple strands of optical fibers into a single one having a straight-line shape without being bent, thereby enabling accurate alignment when fusing optical fibers later.

In addition, the present invention has an adhesive storage tray provided below the optical fiber alignment, thereby enabling the excess adhesive in the adhesive storage tray to be evenly applied to the optical fibers.

In addition, the present invention has still another effect of making operations easy and simple.

As described above, although the present invention has been described with reference to limited embodiments and drawings, the present invention is not limited thereto, and it is needless to say that it is possible for persons with ordinary knowledge in the technical field to which the present invention pertains to variously modify and change the present invention within a range of equivalents of the technical idea and the claims to be described below of the present invention.

While the present invention has been described with respect to the specific embodiments, it will be apparent to those skilled in the art that various changes and modifications may be made without departing from the spirit and scope of the invention as defined in the following claims.

What is claimed is:

1. An optical fiber ribbonizing adhesive applicator comprising:

a clamp sheet (20) being a 'L'-shaped plate and including;

a grip portion (21) formed at an upper side of the clamp sheet (20) and configured to facilitate installation of the clamp sheet at a preset installation position, and a body portion (23) formed at a lower side of the clamp sheet (20), the body portion (23) including:

an optical fiber alignment portion (26) formed at a middle portion of the body portion by cutting the body portion (23), the optical fiber alignment portion (26) being configured to hold optical fibers (10);

a loading portion (24) formed at one side of the body portion to facilitate loading of the optical fibers (10) toward the optical fiber alignment portion (26);

an insertion slit (25) formed between the loading portion (24) and the optical fiber alignment portion (26) to guide the optical fibers (10) to the optical fiber alignment portion (26), the insertion slit (25) having a width (D) smaller than a diameter of the optical fibers (10); and an adhesive storage tray (27) provided below the optical fiber alignment portion (26) and protruding outward from a lateral side of the clamp sheet, the adhesive storage tray having a U-shape and being configured to contain an adhesive to be applied to the optical fibers, horizontal moving means (30) including:

a support (31) having, on one side of an upper surface, a fixing groove (32) in which the clamp sheet (20) is mounted vertically; and a sliding portion (34) installed to be slidable and straightly movable along a guide groove (33) formed in a top side of the support (31) in a longitudinal direction, the sliding portion (34) including:

a fixing portion (35) configured to hold the optical fibers (10); and a settlement portion (36) which is formed integrally formed on one side of the fixing portion (35) and having a mounting space (37) extending in the longitudinal direction to receive an optical connector or the optical fibers (10), wherein a first permanent magnet (39) is provided on a bottom side of the sliding portion (34), a second permanent magnet (38) is provided in the guide groove (33), and a third permanent magnet (40) is provided in the guide groove (33) at a predetermined distance from the second permanent magnet (38), and wherein the second permanent magnet (38) is configured to bring the sliding portion (34) into close contact with the clamp sheet (20), and the third permanent magnet (40) is configured to maintain a movement distance of the sliding portion (34) constant.

* * * * *